US 6,698,835 B2

(12) United States Patent
Kojima et al.

(10) Patent No.: US 6,698,835 B2
(45) Date of Patent: Mar. 2, 2004

(54) SEAT SUPPORT MECHANISM OF VEHICLES

(75) Inventors: Yasuhiro Kojima, Kariya (JP); Yukifumi Yamada, Toyota (JP); Tadasu Yoshida, Kariya (JP); Mikihito Nagura, Kariya (JP); Masaru Wakayama, Kakamigahara (JP); Yasuhiko Mori, Kakamigahara (JP); Takuo Yanagihara, Kakamigahara (JP)

(73) Assignees: Aisin Seiki Kabushiki Kaisha, Kariya (JP); Gifu Shatai Kogyo Kabushiki Kaisha, Kakamigahara (JP)

( * ) Notice: Subject to any disclaimer, the term of this patent is extended or adjusted under 35 U.S.C. 154(b) by 0 days.

(21) Appl. No.: 10/050,551

(22) Filed: Jan. 18, 2002

(65) Prior Publication Data
US 2002/0096615 A1 Jul. 25, 2002

(30) Foreign Application Priority Data
Jan. 19, 2001 (JP) ......................................... 2001-011119

(51) Int. Cl.⁷ .............................. B60N 2/06; B60N 2/12
(52) U.S. Cl. ..................... 297/344.1; 297/331; 297/340; 297/336; 248/429
(58) Field of Search .................. 297/331, 340, 297/341, 335, 336; 248/429, 430; 296/65.13

(56) References Cited

U.S. PATENT DOCUMENTS

| 4,884,843 A | * 12/1989 | DeRees ....................... 297/331 |
| 6,010,190 A | * 1/2000 | Downey ................. 297/340 X |
| 6,183,033 B1 | * 2/2001 | Arai et al. .................. 297/331 |

FOREIGN PATENT DOCUMENTS

| DE | 696 07 885 T2 | 10/2000 |
| DE | 199 32 214 A1 | 1/2001 |
| EP | 0 745 506 B1 | 4/2000 |
| JP | 8-295162 A | 11/1996 |
| JP | 9-286264 A | 11/1997 |

* cited by examiner

Primary Examiner—Anthony D. Barfield
(74) Attorney, Agent, or Firm—Burns, Doane, Swecker & Mathis, LLP

(57) ABSTRACT

A structure for supporting a vehicle seat, which includes a seatback. The seat is slidable relative to a floor of the vehicle, and the seatback inclines forward with respect to the seat. The structure holds the seat in a stable state when the seatback is used as a table. The structure includes a seat cushion, which moves between a normal position at which a passenger may sit on the seat and a lifted position at which the seat cushion is moved from the normal position. A locking member selectively permits and prohibits the sliding of the seat. An actuating member controls the locking member and prohibits the sliding of the seat when the seat cushion is located at the lifted position and the seatback is inclined forward with respect to the seat.

19 Claims, 6 Drawing Sheets

SEAT SUPPORT MECHANISM OF VEHICLES

BACKGROUND OF THE INVENTION

The present invention relates to mechanisms that support seats of vehicles such that the seats slide.

A typical vehicle's seat support mechanism permits a front seat to slide forward when its seatback is folded over, thus making it easy for a passenger to enter or exit the rear of the passenger compartment of a two-door vehicle. Japanese Unexamined Patent Publication No. 8-295162 describes an example of such mechanism. The mechanism includes upper rails for supporting a seat and lower rails secured to the vehicle's floor, when a reclining device folds over the seatback, the upper rails slide forward along the lower rails in accordance with the folding angle of the seatback.

More specifically, the sliding of the upper rails is normally restricted. The mechanism permits the upper rails to slide it the folding angle of the seatback exceeds a predetermined value. Thus, the upper rails, which supports the seat, slides even when using the seatback as a table by folding over the seatback until its rear side becomes substantially horizontal. In such case, the seatback cannot be used as intended since the seat is unstable.

Japanese Unexamined Patent Publication No. 9-286264 describes an example of a structure that solves the problem. In the described structure, each seat includes a pair of shafts. A seatback inclines about the shafts. The two shafts are located on the same side of the seat. If necessary, the two shafts may be provided on each side of the seat. More specifically, one of the shafts, or a first shaft, is located in a cushion of the seat and is used to change the inclination of the seatback, such as when folding over the seatback to move the seat forward. The other shaft, or a second shaft, is located in the seatback and used to change the inclination of the seatback, such as when using the seatback as a table. The seat slides forward when the seatback folds over about the first shaft. In contrast, the sliding of the seat is restricted when the seatback folds over about the second shaft, This enables the rear side of the seatback to be used as intended.

However, in this structure, the second shaft is located at a position higher than the first shaft. Thus, when the rear side of the seatback is substantially horizontal and used as a table, the seatback is placed on the seat cushion. This restricts the space in the passenger compartment above the seatback. Further, the two shafts enlarge the seat and increases cost.

BRIEF SUMMARY OF THE INVENTION

Accordingly, it is an objective of the present invention to provide a smaller seat support mechanism that permits a seatback to fold over to a substantially horizontal state and stabilizes the seat so that the seatback may be used as a table. It is a further objective of the present invention to provide a seat support mechanism that reduces cost and provides more space above the seatback when the seatback is used as a table.

To achieve the foregoing and other objectives and in accordance with the purpose of the present invention, the invention provides a structure for supporting a seat of a vehicle. The seat includes a seatback. The seat is slidable relative to a floor of the vehicle, and the seatback inclines forward with respect to the seat. The structure includes a seat cushion arranged on the seat. The seat cushion is movable between a normal position at which a passenger may sit on the seat and a lifted position at which the seat cushion is moved from the normal position. A locking member selectively permits and prohibits the sliding of the seat. A first actuating member controls the locking member. The first actuating member is capable of releasing the locking member to permit the sliding of the seat when the seat cushion is located at the normal position and the seatback is inclined forward with respect to the seat. The first actuating member is incapable of releasing the locking member when the seat cushion is located at the lifted position and the seatback is inclined forward with respect to the seat.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
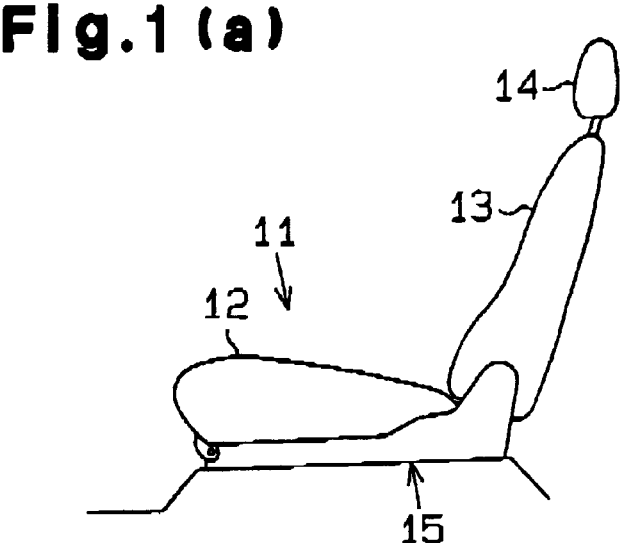
FIGS. 1(a), 1(b), and 1(c) are schematic views each showing a seat and a seat support mechanism according to a preferred embodiment the present invention.
Figure 1:
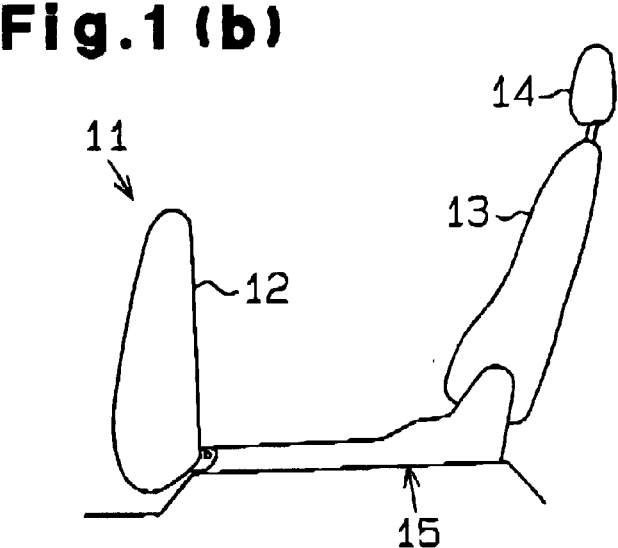
Figure 1:
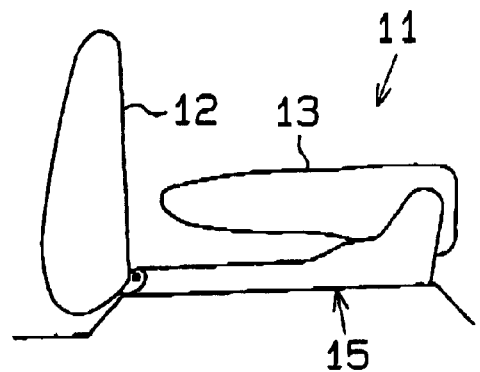

An embodiment of the present invention will now be described with reference to FIGS. 1 to 6.

As shown in FIGS. 1(a) to 1(c), a seat 11 includes a seat cushion 12, a seatback 13, and a headrest 14 detachably attached to the seatback 13. The seatback 13 is pivotal relative to a seat support mechanism 15. A front bottom portion of the seat cushion 12 is connected to the front end of the seat support mechanism 15. The seat cushion 12 may thus be pivoted between a normal position as shown in the state of FIG. 1(a) and a lifted position as shown in the state of FIGS. 1(b) and 1(c).

The seatback 13 inclines with respect to the seat support mechanism 15. More specifically, the lower end of the seatback 13 is connected to the rear end of the seat support mechanism 15. A reclining device 16 (shown in FIGS. 2 to 5) changes the inclination of the seatback 13 with respect to the vehicle's floor surface. As shown in FIG. 1(c), when the seat cushion 12 is located at the lifted position and the headrest 14 is removed, the seatback 13 may be folded over such that the rear side (the side opposite to the side on which a passenger sits) of the seatback becomes substantially horizontal. In this state, the seatback 13 is located at a position corresponding to the normal position of the seat cushion 12. Further, a tray (not shown), which may be used as a table, is arranged on the rear side of the seatback 13.

If the seat cushion 12 is located at the normal position and the folding angle of the seatback 13 exceeds a predetermined value, the seat 11 is permitted to slide forward. This makes it easy for a passenger to enter or exit the rear of the passenger compartment.

The seat support mechanism 15 will hereafter be described in detail. Each side of the seat 11 is provided with substantially the same seat support mechanism 15. Thus, only one seat support mechanism 15 will be described below.

As shown in FIGS. 2 to 5, the seat support mechanism 15 includes a floor rail 21 secured to the vehicle's floor and a sliding unit 22. The floor rail 21 extends in the longitudinal direction of the vehicle. The floor rail 21 includes a rack 23 that has a plurality of substantially rectangular teeth 23a, which extend downward. The teeth 23a are identical to one another.

The sliding unit 22 includes the reclining device 16 and a slider 24. The slider 24 serves as a base to which the reclining device 16 is secured. The reclining device 16 has a recliner block 25 and a seatback support 27. The recliner block 25 is secured to the slider 24. The seatback support 27 rotates around a support shaft 26 with respect to the recliner block 25. Although not illustrated in FIGS. 2 to 5, the seatback 13 is secured to the seatback support 27. Thus, operation of a reclining lever (not shown) reclines (inclines) the seatback 13 around the support shaft 26.

The seat cushion 12 pivots with respect to the slider 24. The slider 24 is engaged with the floor rail 21 and supported such that it slides forward and rearward along the floor rail 21 without falling from the floor rail 21.

As shown in FIGS. 2 to 6, the slider 24 includes a slider base 31. The slider base 31 has a flat plate 32, a slider rail 33, and a reinforcement 34. The slider rail 33 extends along the lower end of the plate 32 and is engaged with the floor rail 21. The reinforcement 34 extends along the upper end of the plate 32.

The floor rail 21 and the slider base 31 form a seat sliding mechanism that supports the seat 11 and permits the seat 11 to slide.

A lock lever 41, or a locking member, is supported on the plate 32 pivotally about a pin 42.

A section of the lock lever 41 rearward from the pin 42 is bent to define a rack engaging portion 43. The rack engaging portion 43 includes a groove that engages a corresponding tooth 23a of the rack 23. The lock lever 41 is located at a position at which an accommodating hole 44 formed in the plate 32 accommodates the rack engaging portion 43. The part of the rack engaging portion 43 extending from the accommodating hole 44 engages a corresponding tooth 23a of the rack 23. When the lock lever 41 is pivoted, the rack engaging portion 43 moves upward and downward. A rack engaging spring 45 (shown only in FIG. 6) connects the rack engaging portion 43 and the reinforcement 34 of the plate 32. The rack engaging spring 45 urges the lock lever 41 upward such that the rack engaging portion 43 engages a tooth 23a of the rack 23, when the rack engaging portion 43 engages a tooth 23a, the sliding of the slider 24 along the floor rail 21 is restricted. Thus, the seat 11 is fixed and does not slide forward or rearward.

A handle securing portion 46 (shown only in FIG. 6) is formed at the front end of the lock lever 41 in front of the pin 42. The handle securing portion 46 connects a sliding handle (not shown) to the lock lever 41. When the sliding handle is operated to pivot the lock lever 41 such that the rack engaging portion 43 is disengaged from the tooth 23a of the rack 23, the slider 24 is permitted to slide along the floor rail 21. Thus, the seat 11 slides forward or rearward regardless of the position of the seat cushion 12.

An elongated hole 47 is formed in the plate 32 of the slider base 31. A pin 48 extends through the elongated hole 47 and is press-fitted in a hold formed in the lock lever 41. The elongated hole 47 and the pin 48 restrict the pivoting movement of the lock lever 41 in a direction that disengages the rack engaging portion 43 from the tooth 23a.

Further, a pressed portion 53 is formed at an upper portion of the lock lever 41 above the rack engaging portion 43. The pressed portion 53 abuts against a pin 52, which is press-fitted into a hole formed in a first actuating member 51.

A bracket base 54, which is secured to the plate 32, includes an intermediate plate portion 55 Most of the intermediate plate portion 55 is flat and parallel to the plate 32 of the slider base 31.

The first actuating member 51 is located between the plate 32 and the intermediate plate portion 55. The first actuating member 51 pivots about a support shaft 56. The plate 32 and the intermediate plate portion 55 support the ends of the support shaft 56. The first actuating member 51 includes a first arm 57 and a second arm 58 that extend from the support shaft 56. The pin 52 extends through an arcuate hole 59 formed in the plate 32 and is press-fitted into a hole of the first arm 57. A coil spring 60 is arranged on the support shaft 56 to urge the first actuating member 51 in a direction that moves the pin 52 away from the pressed portion 53 of the lock lever 41. When the pin 52 contacts an end of the arcuate hole 59, further pivoting of the first actuating member 51 is restricted. A pin 61 is press-fitted into a hole of the second arm 58. If an external force is applied to the pin 61 to pivot the first actuating member 51 such that the pin 52 presses the pressed portion 53, the lock lever 41 pivots and disengages the rack engaging portion 43 from the tooth 23a of the rack 23. In other words, the first actuating member 51 shifts the lock lever 41 between positions permitting and restricting the sliding of the seat 11.

A second actuating member 71 moves along the intermediate plate portion 55. An elongated guide hole 72 is formed in the intermediate plate portion 55. A guide pin 73 extends through the guide hole 72 and is press-fitted in a hole of the second actuating member 71. The width of the guide hole 72 is substantially equal to the diameter of the portion of the guide pin 73. The guide hole 72 is curved such that the middle of the guide hole 72 is lower than the other portions of the guide hole 72. The second actuating member 71 is arranged so that the guide pin 73 is movable in the guide hole 72.

An elongated, generally V-shaped connection hole 74 is formed in the second actuating member 71 in front of the guide pin 73. The connection hole 74 includes a first portion 76 and a second portion 77. The first portion 76 extends horizontally. The second portion 77 extends upward from the rear end of the first portion 76 slightly inclined toward the front end of the first portion 76. The rear end of the first portion 76 is connected with the lower end of the second portion 77.

An arc-like elongated hole 75, which is formed in the intermediate plate portion 55, extends about the support shaft 56. The pin 61, which is secured to the first actuating member 51, extends through the connection hole 74 and the elongated hole 75. The widths of the first and second portions 76, 77 are substantially equal to the diameter of the pin 61. The first portion 76 is curved such that the middle of the first portion 76 is slightly higher than the rear end of the first portion 76. The pin 61 moves in the connection hole 74 relative to the second actuating member 71.

A spring receiver 78 is formed in the second actuating member 71 near the middle of the first portion 76. A spring receiver 79 is formed at the front end of the bracket base 54. A spring 80 connects the spring receivers 78, 79 to each other and urges the second actuating member 71 toward the front in an upward direction.

A pin base 81 is formed at the upper end of the second actuating member 71 above the connection hole 74. An abutment pin 82 projects upward from the pin base 81 and abuts against the bottom of the seat cushion 12.

As shown in FIGS. 2 to 5, a wire pin 83 is formed on the second actuating member 71 between the guide pin 73 and the connection hole 74. The wire pin 83 is connected to one end of a wire 84 that is guided by a tubular wire guide 87. A pair of wire guide holders 85, 86 are formed respectively on the rear end of the bracket base 54 and on the recliner block 25. The wire guide holders 85, 86 hold the wire guide 87. The other end of the wire 84 is connected to a pull lever 88 in the reclining device 16. The pull lever 88 rotates around the support shaft 26 of the reclining device 16. The pull lever 88 includes a first arm 89 and a second arm 90 that extend from the portion connected to the support shaft 26. The distal end of the second arm 90 is connected to one of the wire 84. A pressed portion 92 is formed at the distal end of the first arm 89 and engages a projection 91 of the seatback support 27. When the seatback 13 is inclined about the support shaft 26 and its folding angle exceeds a predetermined value, the projection 91 presses the pressed portion 92 and rotates the pull lever 88 counterclockwise, as viewed in FIGS. 2 to 5. In this case, the second arm 90 pulls the wire 84 and causes the wire pin 83 to move the second actuating member 71 rearward so that the seat 11 becomes slidable.

Figure 2:
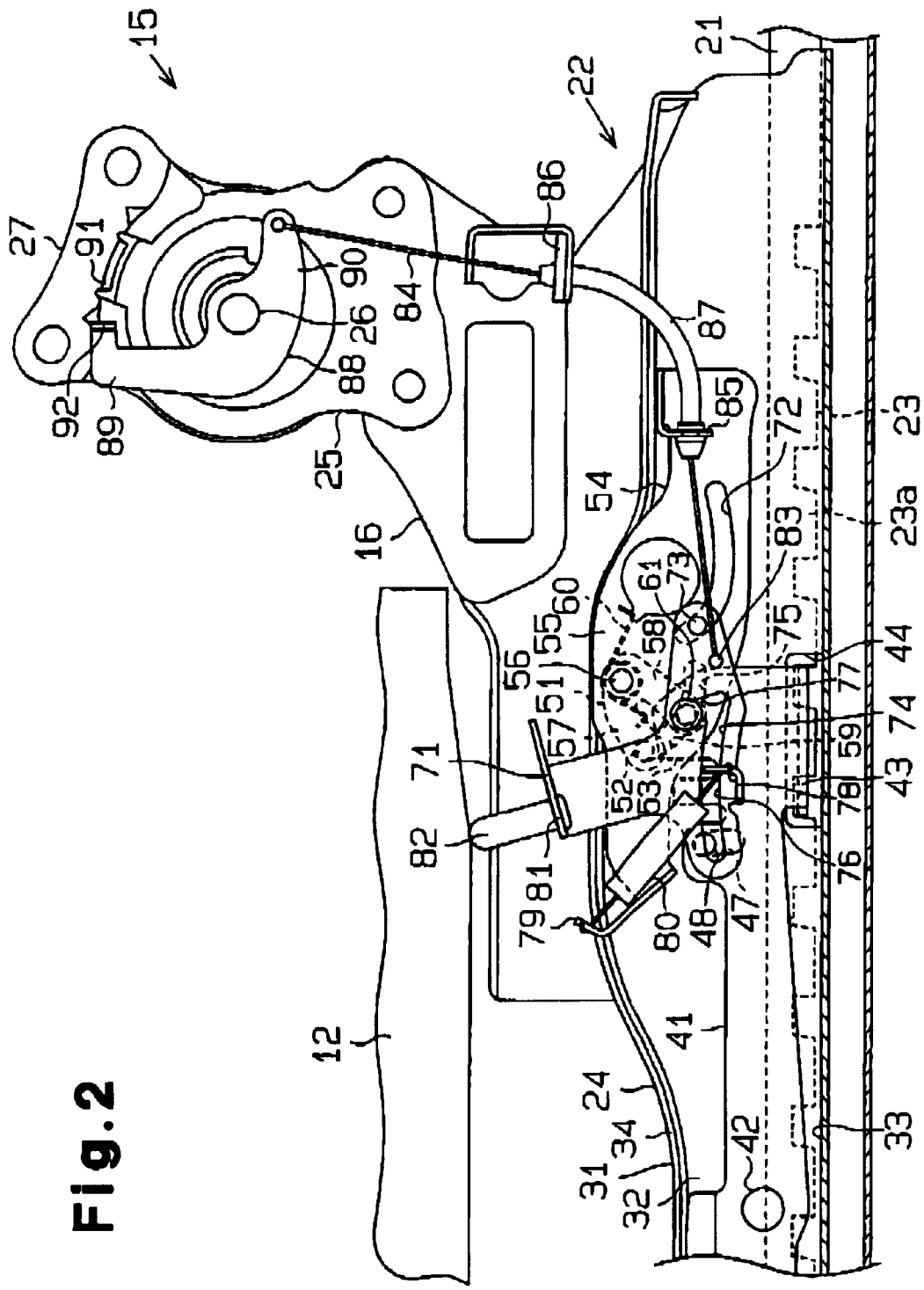
FIG. 2 is a schematic side view showing a seat support mechanism in a state in which a seatback is held upright when a seat cushion is arranged at a normal position.

When the seat cushion 12 is located at the normal position and the projection 91 is separated from the pressed portion 92 of the pull lever 88, as shown in the state of FIG. 2, the spring 80 urges the second actuating member 71 forward and the seat cushion 12 presses the abutment pin 82 downward. In this state, the second actuating member 71 is held at a position at which the pin 61 connected with the first actuating member 51 is located at the upper end of the second portion 77. Further, the pin 52 connected with the first actuating member 51 does not press the pressed portion 53 of the lock lever 41. The rack engaging portion 43 of the lock lever 41 is thus engaged with the rack 23 and restricts the sliding of the seat 11.

Figure 3:
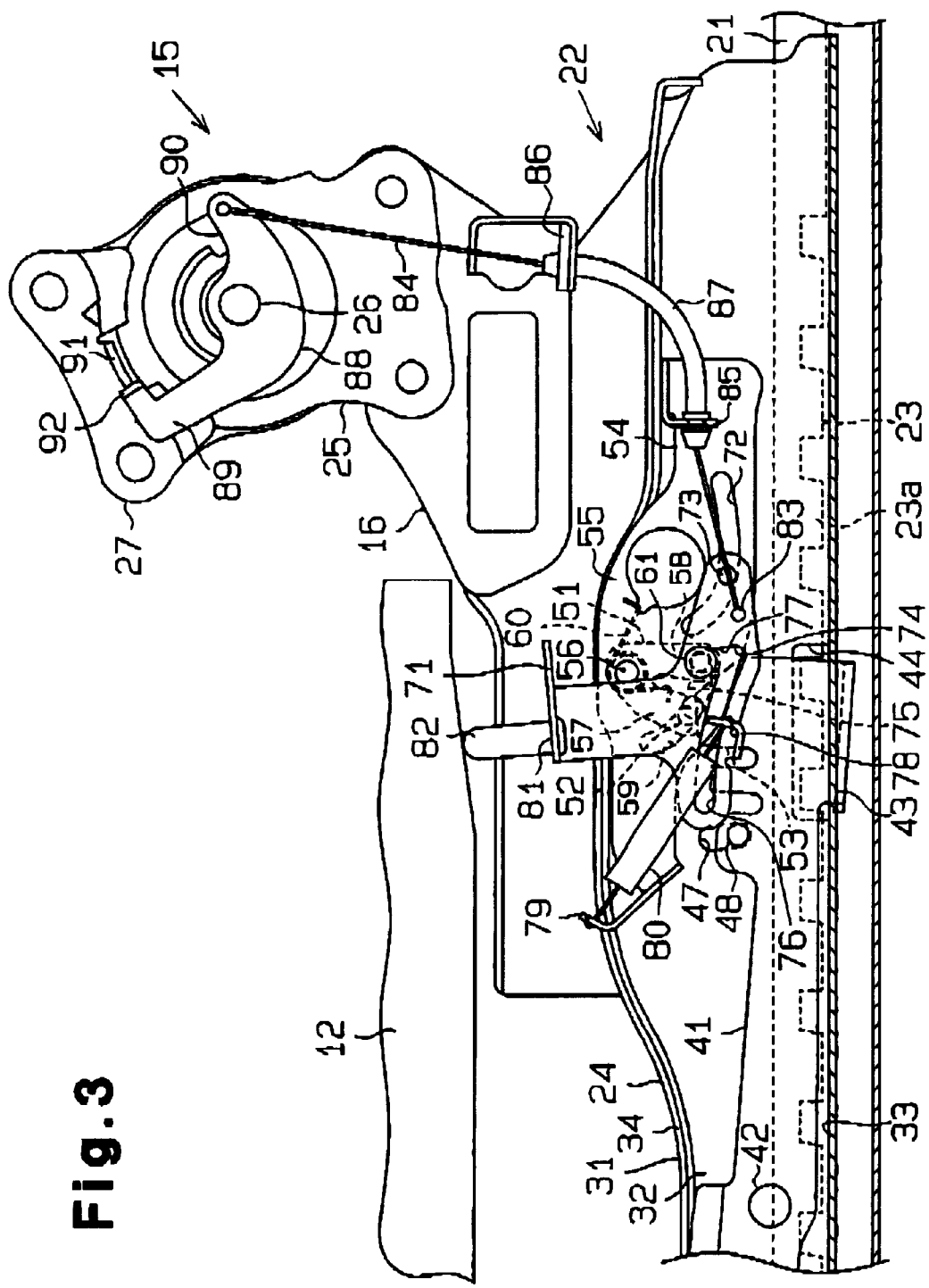
FIG. 3 is a schematic side view showing the seat support mechanism of FIG. 2 in a state in which the seatback is folded over when the seat cushion is arranged at the normal position.

When the seatback 13 (not shown in FIG. 3) is inclined from the state of FIG. 2 to the state of FIG. 3, the projection 91 rotates the pull lever 88 counterclockwise such that the wire 84 moves the second actuating member 71 rearward. In this state, the guide pin 73 moves in the guide hole 72 and the first actuating member 51 rotates counterclockwise with the pin 61 engaging the wall defining the upper end of the second portion 77. The pin 52 thus presses the pressed portion 53 of the lock lever 41 and disengages the rack engaging portion 43 from the corresponding tooth 23a of the rack 23 such that the seat 11 is permitted to slide. In other words, as long as the seat cushion 12 is located at the normal position, the second actuating member 71 enables the first actuating member 51 to move the lock lever 41 and permit the sliding of the seat 11. When the sliding of the seat 11 is permitted, a spring (not shown) urges the seat 11 to slide forward.

Figure 4:
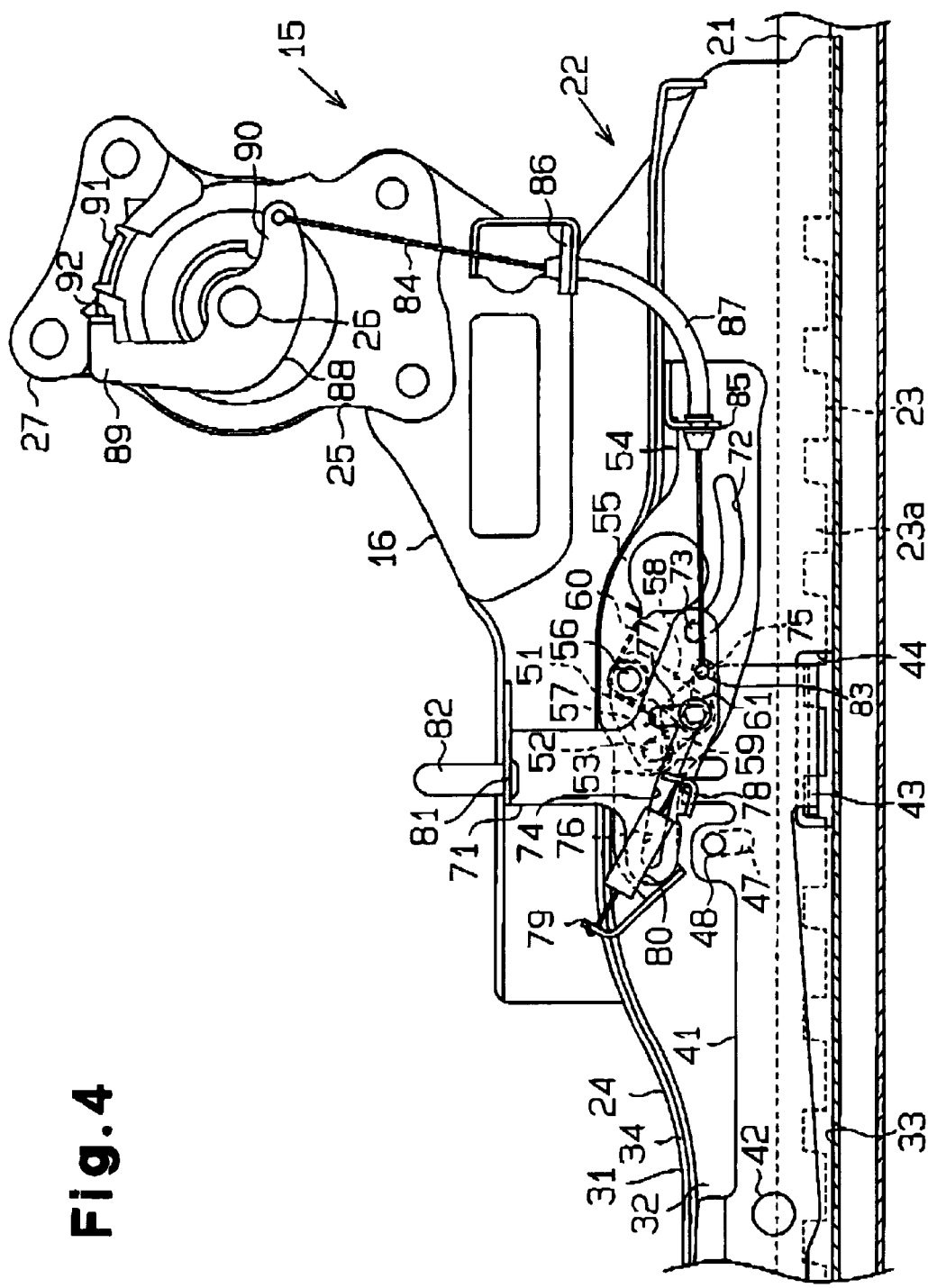
FIG. 4 is a schematic side view showing the seat support mechanism of FIG. 2 in a state in which the seatback is held upright when the seat cushion is arranged at a lifted position.

When the seat cushion 12 is lifted from the state of FIG. 2 to the lifted position, as shown in the state of FIG. 4, the seat cushion 12 releases the abutment pin 82 such that the spring 80 urges the second actuating member 71 upward. In this state, the second actuating member 71 is held at a position at which the pin 61 connected with the first actuating member 51 is located at the lower end of the second portion 77 (the rear end of the first portion 76). Further, the pin 52 connected with the first actuating member 51 does not press the pressed portion 53. The rack engaging portion 43 of the lock lever 41 is thus engaged with the corresponding tooth 23a of the rack 23 and restricts the sliding of the seat 11.

Figure 5:
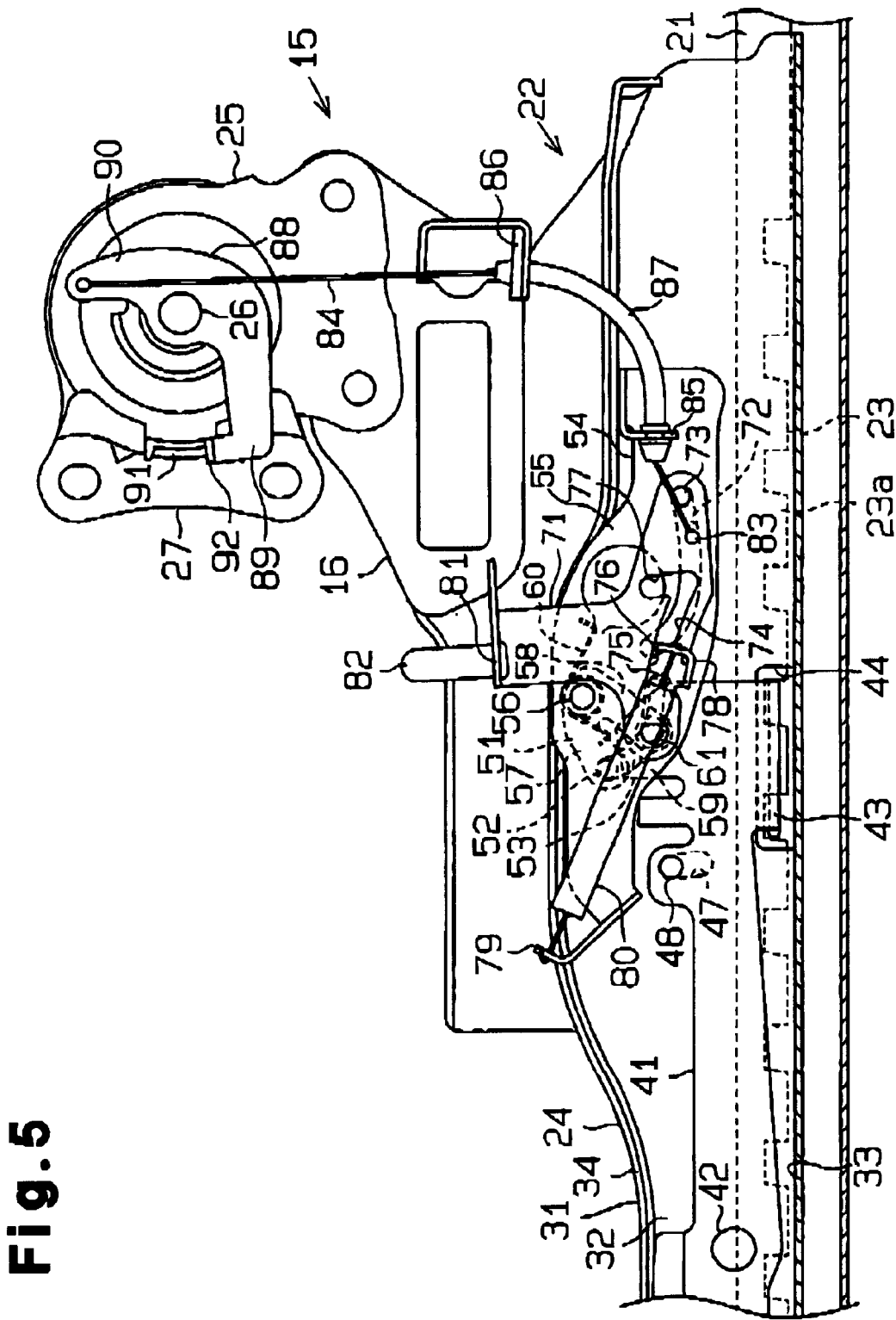
FIG. 5 is a schematic side view showing the seat support mechanism of FIG. 2 in a state in which the seatback is folded over when the seat cushion is arranged at the lifted position.
Figure 6:
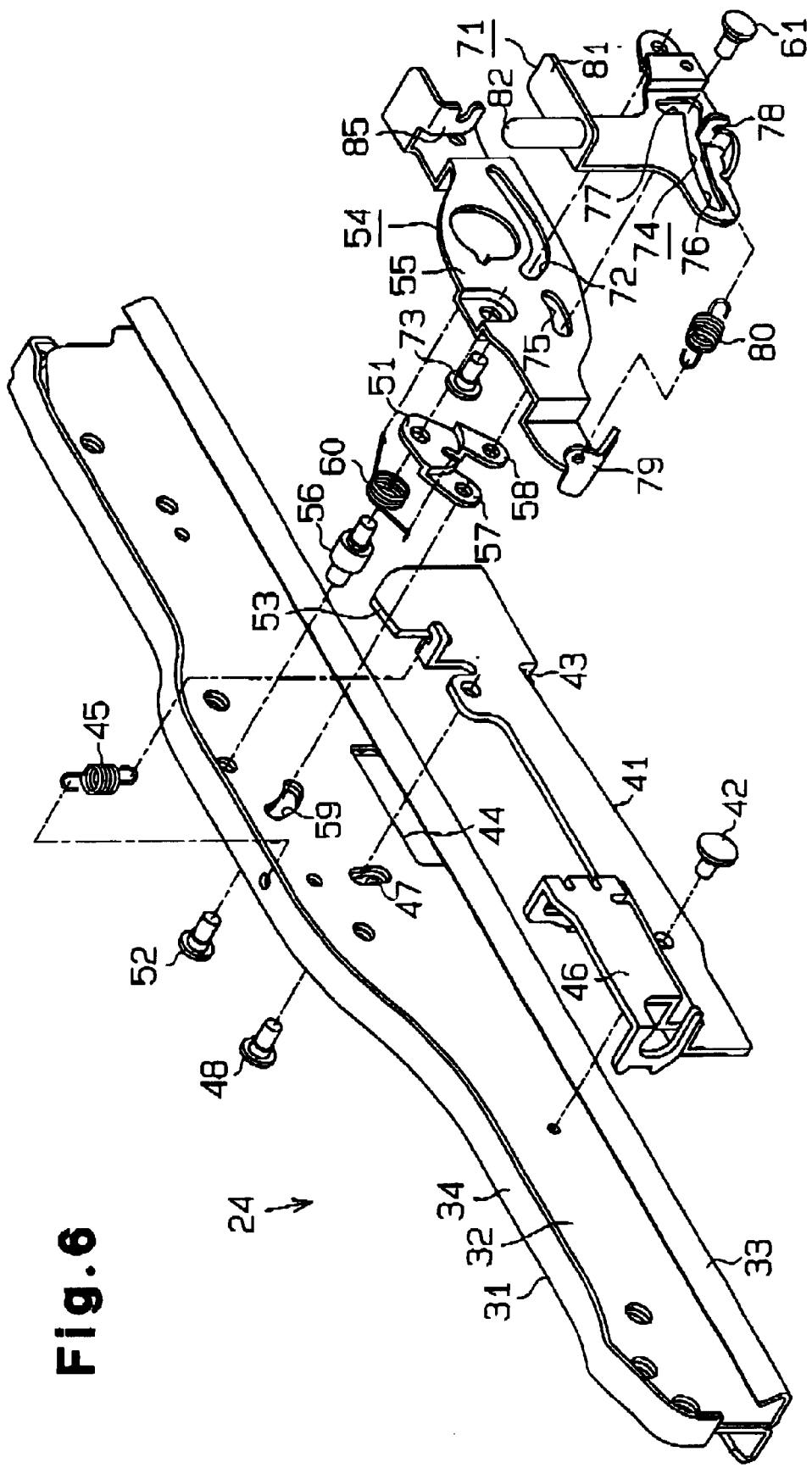
FIG. 6 is an exploded perspective view showing a slider of the seat support mechanism.

When the seatback 13 (not shown in FIG. 5) is folded over from the state of FIG. 4 to the state of FIG. 5, the projection 91 rotates the pull lever 88 counterclockwise such that the wire 84 moves the second actuating member 71 rearward. In this state, the guide pin 73 moves in the guide hole 72 and the second actuating member 71 moves rearward such that the pin 61 moves forward in the first portion 76 relative to the second actuating member 71. Since the second actuating member 71 does not move the pin 61 in this state, the first actuating member 51 does not pivot. Further, the pin 52 remains separated from the pressed portion 53 of the lock lever 41. Thus, the rack engaging portion 43 of the lock lever 41 remains engaged with the tooth 23a of the rack 23. In other words, as long as the seat cushion 12 is located at the lifted position, the second actuating member 71 prevents the first actuating member 51 from moving the lock lever 41 to permit the sliding of the seat 11. Accordingly, even when the seatback 13 is folded over such that the rear side of the seatback 13 becomes substantially horizontal, the seat 11 remains fixed and does not slide in the forward and rearward directions.

The illustrated embodiment has the following effects.

(1) The first actuating member 51 cooperates with the lock lever 41 to selectively permit and restrict the sliding of the seat 11, the second actuating member 71 selectively permits and restricts the movement of the first actuating member 51 depending on the position of the seat cushion 12. Thus, when the seatback 13 is folded over, the sliding of the seat 11 in the forward and rearward directions is selectively permitted and restricted depending on the position of the seat cushion 12. Accordingly, the seat 11 remains fixed when using the seatback 13 as a table by folding over the seatback 13. In other words, if the seat cushion 12 is lifted to the lifted position from the normal position, the seat 11 does not slide even when the seatback 13 is folded over. In this state, the seatback 13 may be folded over to the position where the seat cushion 12 is normally arranged, Accordingly, compared to when the seatback 13 is folded over on the seat cushion 12, the seatback 13 of the preferred and illustrated embodiment is located at a relatively low position. This provides more space above the seatback 13. Further, mechanisms for permitting the seat 11 to slide when the seatback 13 is folded and for folding over the seatback 13 while restricting the sliding of the seat 11 do not have to be provided separately. The seat support mechanism is thus compact and the cost of the mechanism is reduced.

(2) When the seat cushion 12 is located at the normal position, the second actuating member 71 enables the movement of the first actuating member 51 to slide the seat 11. Thus, the seat 11 slides forward when the seatback 13 is folded over as long as the seat cushion 12 is located at the normal position. This makes it easy to enter or exit the rear of the passenger compartment.

(3) When the seat cushion 12 is located at the lifted position, the second actuating member 71 prohibits the movement of the first actuating member 51 and so that the lock lever 41 restricts the sliding of the seat 11. Thus, the seat 11 does not slide forward even when the seatback 13 is folded over as long as the seat cushion 12 is located at the lifted position. Accordingly, the rear side of the seatback 13 may be used as a table in a stable state.

It should be apparent to those skilled in the art that the present invention may be embodied in many other specific forms without departing from the spirit or scope of the invention. Particularly, it should be understood that the present invention may be embodied in the following forms.

In the preferred and illustrated embodiment, when the sliding of the seat 11 is permitted, a spring urges the seat 11 forward. However, in this state, the seat 11 does not necessarily have to be urged by the spring.

A link, such as a rod, may be used in lieu of the wire 84 or the pull lever 88 that moves the second actuating member 71 in the preferred and illustrated embodiment.

In the preferred and illustrated embodiment, the abutment pin 82 of the second actuating member 71 is engaged with the bottom of the seat cushion 12. However, the abutment pin 82 may engage components other than the bottom of the seat cushion 12. For example, an abutment piece may project from the seat cushion 12 to engage the abutment pin 82.

The seat cushion 12 may be removed from the seat support mechanism 15. If the seat cushion 12 is removed from the seat support mechanism 15 and stored at a separate location, the seat cushion 12 does not have to remain lifted from the seat 11 as shown in the state of FIG. 1(c).

The present examples and embodiments are to be considered as illustrative and not restrictive and the invention is not to be limited to the details given herein, but may be modified within the scope and equivalence of the appended claims.

What is claimed is:

1. A seat for a vehicle that is adapted to be mounted on a floor of the vehicle for sliding movement relative to the floor of the vehicle, comprising:
   a seatback adapted to be inclined forward;
   a seat cushion movable between a normal position at which a passenger may sit on the seat and a lifted position at which the seat cushion is moved from the normal position;
   a locking member for selectively permitting and prohibiting the sliding of the seat; and
   a first actuating member for controlling the locking member, wherein the first actuating member is rotatable in a vertical plane and is capable of releasing the locking member to permit the sliding of the seat when the seat cushion is located at the normal position and the seatback is inclined forward with respect to the seat, and the first actuating member is incapable of releasing the locking member when the seat cushion is located at the lifted position and the seatback is inclined forward with respect to the seat.

2. The seat according to claim 1, further comprising:
   a rail adapted to be arranged on the floor of the vehicle to slidably support the seat; and
   a slider pivotally supporting the seat cushion and slidably arranged on the rail.

3. The seat according to claim 2, wherein the slider has a front portion at which the seat cushion is supported so that the seat cushion is pivotal to the front;
   wherein the seatback is arranged horizontally above the slider when the seat cushion is located at the lifted position and the seatback is inclined forward with respect to the seat.

4. The seat according to claim 2, further comprising:
   a rack arranged on the rail;
   wherein the locking member includes a lock lever attached to the slider and having an engaging portion, the engaging portion moving the lock lever to selectively engage and disengage the engaging portion and the rack.

5. The seat according to claim 4, wherein the first actuating member is attached to the slider and actuates the lock lever to engage and disengage the engaging portion and the rack.

6. The seat according to claim 1, further comprising:
   a second actuating member for selectively permitting and prohibiting the actuation of the locking member with the first actuating member when the seat cushion is located at the lifted position.

7. A seat of for a that is adapted to be mounted on a floor of the vehicle for sliding movement relative to the floor of the vehicle, comprising:
   a seatback adapted to be inclined forward;
   a seat cushion movable between a normal position at which a passenger may sit on the seat and a lifted position at which the seat cushion is moved from the normal position;
   a locking member for selectively permitting and prohibiting the sliding of the seat;
   a first actuating member for releasing the locking member in cooperation with the inclination of the seatback, whereby the locking member switches the sliding of the seat between the permitted state and the prohibited state, the first actuating member being rotatable in a vertical plane; and
   a second actuating member for selectively permitting and prohibiting the releasing of the locking member with the first actuating member based on the position of the seat cushion.

8. The seat according to claim 7, further comprising:
   a rail adapted to be arranged on the floor of the vehicle to slidably support the seat; and
   a slider pivotally supporting the seat cushion and slidably arranged on the rail.

9. The seat according to claim 8, wherein the slider has a front portion at which the seat cushion is supported so that the seat cushion is pivotal to the front;
   wherein the seatback is arranged horizontally above the slider when the seat cushion is located at the lifted position and the seatback is inclined forward with respect to the seat.

10. The seat according to claim 8, further comprising:
    a rack arranged on the rail;
    wherein the locking member includes a lock lever attached to the slider and having an engaging portion, the engaging portion moving the lock lever to selectively engage and disengage the engaging portion of the rack.

11. The seat according to claim 10, wherein the first actuating member is attached to the slider and actuates the lock lever to engage and disengage the engaging portion and the rack.

12. A vehicle seat support structure for slidably supporting on a vehicle floor a vehicle seat that comprises a seatback adapted to be inclined forward and a seat cushion movable between a normal position at which a passenger may sit on the seat and a lifted position at which the seat cushion is moved from the normal position, the seat support structure comprising:

a locking member for selectively permitting and prohibiting the sliding of the seat; and a rotatable first actuating member for controlling the locking member, the first actuating member being rotatable in a vertical plane and being operative to release the locking member to permit sliding of the seat when the seat cushion is in the normal position and the seatback is inclined forward, and being unable to release the locking member when the seat cushion is in the lifted position and the seatback is inclined forward.

13. The vehicle seat support structure according to claim 12, further comprising:

a rail adapted to be secured to the floor of the vehicle to slidably support the seat; and a slider pivotally supporting the seat cushion and slidably arranged on the rail.

14. The vehicle seat support structure according to claim 13, wherein the seat cushion is pivotally supported at a front portion of the slider, and the seatback is arranged horizontally above the slider when the seat cushion is in the lifted position and the seatback is inclined forward.

15. The vehicle seat support structure according to claim 13, further comprising:

a rack arranged on the rail;

wherein the locking member includes a lock lever attached to the slider and having an engaging portion, the engaging portion moving the lock lever to selectively engage and disengage the engaging portion and the rack.

16. The vehicle seat support structure according to claim 15, wherein the first actuating member is attached to the slider and actuates the lock lever to engage and disengage the engaging portion and the rack.

17. The vehicle seat support structure according to claim 12, further comprising:

a second actuating member for selectively permitting and prohibiting actuation of the locking member by the first actuating member when the seat cushion is in the lifted position.

18. The vehicle seat support structure according to claim 17, further comprising:

a bracket base having a plate portion, and a guide pin fitted into a guide hole in the plate portion of the bracket base and a hole in the second actuating member so that the second actuating member is movable along the plate portion of the bracket base.

19. The vehicle seat support structure according to claim 12, further comprising a spring connected to the first actuating member to apply a biasing force to the first actuating member.

* * * * *